United States Patent
England et al.

(10) Patent No.: US 8,678,270 B2
(45) Date of Patent: Mar. 25, 2014

(54) HOT ZONE IGNITER

(75) Inventors: Diane M. England, Bloomfield, NY (US); Gail E. Geiger, Caledonia, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/420,974

(22) Filed: Mar. 15, 2012

(65) Prior Publication Data

US 2012/0175405 A1    Jul. 12, 2012

Related U.S. Application Data

(62) Division of application No. 12/157,662, filed on Jun. 12, 2008, now Pat. No. 8,158,909.

(51) Int. Cl.
*B23K 31/02* (2006.01)
(52) U.S. Cl.
USPC .................. 228/124.1; 228/122.1; 228/262.9
(58) Field of Classification Search
USPC ......................... 228/121, 121.1, 124.1, 262.9
See application file for complete search history.

(56) References Cited

U.S. PATENT DOCUMENTS

| | | | |
|---|---|---|---|
| 3,736,648 A * | 6/1973 | Spielberg et al. | 228/122.1 |
| 3,842,319 A * | 10/1974 | Perl | 219/260 |
| 3,875,477 A * | 4/1975 | Fredriksson et al. | 361/264 |
| 4,315,298 A * | 2/1982 | Mulkins et al. | 361/253 |
| 4,345,555 A | 8/1982 | Oshima et al. | |
| 4,429,003 A * | 1/1984 | Fredriksson et al. | 428/317.9 |
| 4,650,963 A | 3/1987 | Yokoi | |
| 4,835,344 A * | 5/1989 | Iyogi et al. | 174/267 |
| 4,852,530 A | 8/1989 | John | |
| 5,564,618 A * | 10/1996 | Axelson | 228/124.1 |
| 6,420,683 B1 | 7/2002 | Chiba et al. | |
| 6,930,283 B2 | 8/2005 | Reissner et al. | |
| 7,078,659 B2 | 7/2006 | Yokoyama et al. | |
| 2009/0308858 A1 | 12/2009 | England et al. | |

* cited by examiner

Primary Examiner — Nicholas P D'Aniello
(74) Attorney, Agent, or Firm — Thomas N. Twomey

(57) ABSTRACT

A method is provided for brazing a metal leadframe clip to an electrical resistance heating tip for an electrical resistance igniter, wherein the electrical resistance heating tip includes silicon carbide. The method includes forming a layer of $SiO_2/Al_2O_3$ on a surface of the electrical resistance heating tip; applying a braze alloy paste between the layer of $SiO_2/Al_2O_3$ and the metal leadframe clip; and heating the braze alloy, the metal leadframe clip and the electrical resistance heating tip to fuse the braze alloy.

6 Claims, 1 Drawing Sheet

HOT ZONE IGNITER

CROSS REFERENCE TO RELATED APPLICATIONS

This application is a divisional application of U.S. Ser. No. 12/157,662 filed on Jun. 12, 2008.

RELATIONSHIP TO GOVERNMENT CONTRACTS

The present invention was supported in part by a U.S. Government Contract, Number DE-FC36-04G014319. The United States Government may have rights in the present invention.

TECHNICAL FIELD OF INVENTION

The present invention relates to devices for igniting combustible mixtures of gases; more particularly, to an electrical resistance igniter; and most particularly, to methods and materials for forming an improved igniter capable of sustained service at temperatures consistent with a high temperature environment such as, for example, a reformer combustion chamber or the anode stack gas of a solid oxide fuel cell system.

BACKGROUND OF INVENTION

Solid oxide fuel cell (SOFC) systems require ignition devices to ignite the air/fuel mixture in the fuel reformer during reformer warm-up and also the anode and cathode tail gases exiting the fuel cell stacks. Both the fuel cell reformer and the stacks operate in a very high temperature environment where temperatures can range from about 750° C. to about 1000° C., and typically are about 850° C. In SOFC applications, the ignition devices are completely contained in the high temperature environment, which is an atypical operating environment for prior art ignition devices adapted from other technologies. For example, diesel glow plugs and gasoline spark igniters are intended to withstand very high temperatures (>1000° C.) only at the very tip of the igniter element, while the rest of the device consists of materials, and is manufactured with processes intended to withstand temperatures much lower, typically in the range of about 300° C. to about 600° C. As a result, prior art ignition devices may fail to ignite after relatively short periods of time, such as about 10 hours to about 100 hours, when installed in an SOFC system. Since the working lifetime of an SOFC system at high temperature can be on the order of about 10,000 hours to about 40,000 hours, there is a need for an ignition device which can function reliably under sustained exposure to SOFC operating temperatures and can also reliably ignite a fuel/air mixture when an SOFC system cold re-start is commanded.

Prior art igniters fail in SOFC applications due to loss of electrical connectivity that occurs when the prior art materials used in the igniter undergo catastrophic oxidation due to the high temperature environment. Wire insulation becomes brittle and cracks, leaving the wire exposed to the environment. Prior art wire is formed of pure copper or pure nickel. Such wire cannot be used at temperatures above about 600° C. without suffering severe oxidation. Further, the prior art ceramic potting compound also fails due to a powdering phenomenon which leaves the igniter joint loose and susceptible to vibrations. Further, the prior art igniter braze re-melts, causing electrical disconnection of the metal clip to the igniter tip. Even further, the metal clips in a prior art design are made of a metal material which cannot withstand temperatures exceeding about 650° C.

What is needed in the art is a hot zone igniter capable of sustained service at temperatures consistent with the reformer combustion chamber and the anode stack gas of a solid oxide fuel cell system.

It is a principal object of the present invention to increase the working lifetime of a hot zone igniter for a fuel cell system.

SUMMARY OF THE INVENTION

Briefly described, a hot zone igniter in accordance with the present invention employs alloy materials that are resistant to high temperature, such as a silicon carbide and aluminum nitride composite for the heating tip; a nickel-chromium alloy for the igniter wires; a nickel-based superalloy for the metal leadframe clip, such as Inconel 600/Inconel 625; a nickel-based braze alloy; an alumina ceramic body; and a zirconia potting compound.

Prior to brazing the heating tip to the metal leadframe clip, the tip is thoroughly cleaned with alcohol and then air oxidized at high temperature to create a sacrificial $SiO_2$—$Al_2O_3$ layer on the igniter tip that prevents reaction of the igniter tip during brazing. A $TiH_2$ layer is added to the igniter tip to insure adequate wetting of the igniter tip by the braze.

BRIEF DESCRIPTION OF DRAWINGS

The present invention will now be described, by way of example, with reference to the accompanying drawings, in which.

Corresponding reference characters indicate corresponding parts throughout the views. The exemplification set out herein illustrates one preferred embodiment of the invention, in one form, and such exemplification is not to be construed as limiting the scope of the invention in any manner.

DETAILED DESCRIPTION OF INVENTION

Figure 1:
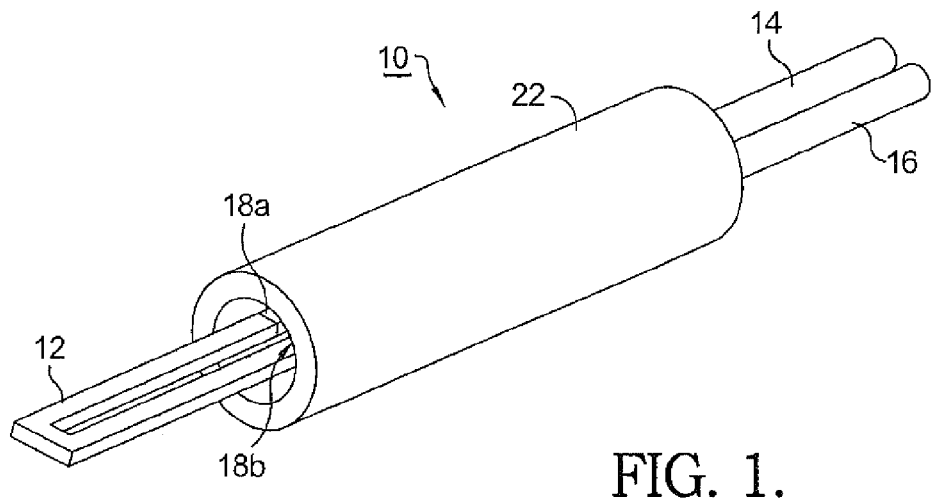
FIG. 1 is an isometric view of an improved hot zone igniter in accordance with the present invention.
Figure 2:
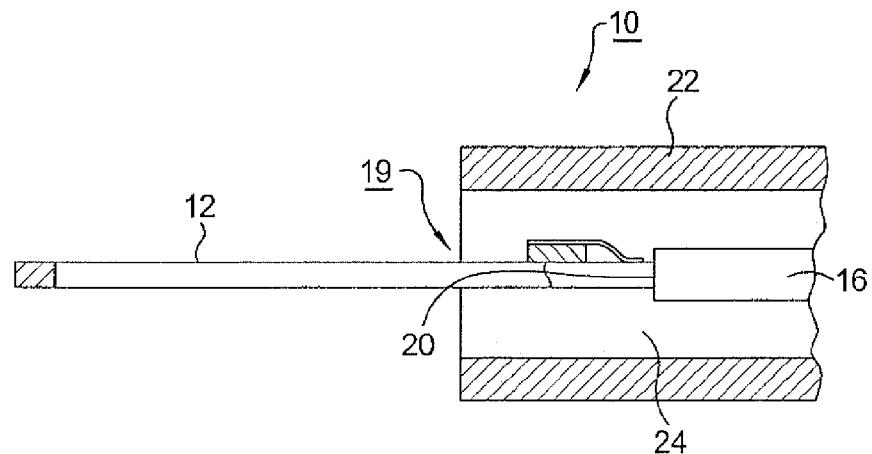
FIG. 2 is a longitudinal cross-sectional view of the igniter shown in FIG. 1.

Referring to FIGS. 1 and 2, an improved hot zone igniter 10 is suitable for use at temperatures consistent with the reformer combustion chamber and the anode stack gas of a solid oxide fuel cell system (not shown) wherein combustible gases must be ignited in warming of a hydrocarbon fuel reformer and also at the exit of anode and cathode stacks thereof, as is well known in the fuel cell arts.

Igniter 10 comprises a U-shaped electrical resistance heating tip 12 formed preferably of an alloy of SiC, AlN, and $MoSi_2$. Wire leads 14,16 for supplying electric current to heating tip 12 are preferably formed of an 80Ni-20Cr Nichrome alloy, which resists oxidation up to temperatures of at least 900° C. Metal leadframe clips 18a,18b are provided for connecting tip 12 to wire leads 14,16 and preferably are formed of a nickel-based superalloy such as Inconel 600, Inconel 625, or Haynes 230. Tip 12 and wire leads 14,16 are brazed to metal leadframe clips 18a,18b via an improved brazing compound 20 that is a nickel-based alloy. A currently preferred composition for the braze is 10-15% Pd, 5-7% Co, 15-18% Cr, 2.5-3% B and the balance Ni. Preferably, a $TiH_2$ layer (not visible in FIGS. 1,2) is added to the surface of igniter tip 12 prior to brazing to insure adequate wetting of the igniter tip by the braze. Preferably, an Fmica electrical insulation barrier (not visible in FIGS. 1,2) is added between metal leadframe clips 18a,18b as a braze break to insure that molten braze does not climb and extend between the metal leadframe clips thereby electrically shorting the igniter tip. Insulation on wire leads 14,16 preferably is woven alumina. A tubular body 22 surrounds a portion of the resistance heating tip 12, the metal leadframes 18a,18b, and the wire leads 14,16 (which define a subassembly 19). Body 22 is filled with a curable high-temperature potting compound 24, preferably a compound comprising a zirconia-based adhesive. The material system of the present invention (high temperature oxidation resistant alloys, brazes, wires, and potting compound) enables a high temperature-capable igniter in accordance with the present invention.

One aspect of the process for forming a hot zone igniter in accordance with the present invention comprises at least the following steps:

a) holding the electrical resistance heating tip in air for between about four hours and about eight hours at a temperature of about 975° C. to form a sacrificial oxide layer comprising $SiO_2$ and $Al_2O_3$ on the surface of the heating tip to prevent attack of the SiC and $MoS_2$ by the braze during a subsequent brazing step; the sacrificial layer decomposes in the vacuum or hydrogen braze process during which the $SiO_2$ is consumed by the braze alloy slowly over time;

b) applying a layer of $TiH_2$ to the oxide layer on the heating tip surface, preferably by application of a mixture of $TiH_2$ in dehydrated ethanol, then allowing the alcohol to evaporate;

c) applying a paste of braze alloy between the $TiH_2$ layer and the metal leadframe clips 18a,18b, and also between the metal leadframe clips 18a,18b and the wire leads 14,16 to form igniter subassembly 19; and d) heating and cooling igniter subassembly 19 through a brazing thermal cycle to braze the resistance tip and the wire leads to the leadframe clips. A currently-preferred furnace braze process cycle includes bringing igniter assembly 19 to about 1125° C. and holding the igniter assembly at that temperature for about 30 minutes.

After the brazing, subassembly 19 is inserted into body 22 which then is filled with potting compound 24, as shown in FIGS. 1 and 2, which is then cured to provide improved hot zone igniter 10.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

We claim:

1. A method for brazing a metal leadframe clip to an electrical resistance heating tip for an electrical resistance igniter, wherein said electrical resistance heating tip includes silicon carbide, comprising the steps of:
    a) forming a layer of $SiO_2/Al_2O_3$ on a surface of said electrical resistance heating tip;
    b) applying a braze alloy paste between said layer of $SiO_2/Al_2O_3$ and said metal leadframe clip; and
    c) heating said braze alloy paste, said metal leadframe clip and said electrical resistance heating tip to braze said metal leadframe clip to said electrical resistance heating tip.

2. A method in accordance with claim 1 wherein said step of forming a layer of $SiO_2/Al_2O_3$ includes the step of holding said electrical resistance heating tip in air for about four hours at a temperature of about 975° C.

3. A method in accordance with claim 1 comprising the step of applying a layer of $TiH_2$ to said layer of $SiO_2/Al_2O_3$.

4. A method in accordance with claim 3 wherein said layer of $TiH_2$ is applied to said layer of $SiO_2/Al_2O_3$ by applying a mixture of $TiH_2$ in dehydrated ethanol and allowing the dehydrated ethanol to evaporate.

5. A method in accordance with claim 1 further comprising the step of:
    d) decomposing said layer of $SiO_2/Al_2O_3$.

6. A method in accordance with claim 5 wherein said decomposing step occurs during said heating step.

* * * * *